United States Patent [19]

Lofredo

[11] Patent Number: 4,578,886
[45] Date of Patent: Apr. 1, 1986

[54] COMBINATION HOLDER FOR DISPLAYING A PHONOGRAPH AND A DECORATIVE WALL DISPLAY FRAME

[76] Inventor: Raymond A. Lofredo, 3626 Fairmont Ave., San Diego, Calif. 92105

[21] Appl. No.: 616,077

[22] Filed: Jun. 1, 1984

[51] Int. Cl.[4] ............................ A47G 1/06; G09F 1/12
[52] U.S. Cl. ....................................... 40/152.1; 40/152; 40/158 R
[58] Field of Search ................... 40/152, 152.1, 154, 40/155, 158 R, 158 A

[56] References Cited

U.S. PATENT DOCUMENTS

| | | | |
|---|---|---|---|
| 2,388,431 | 11/1945 | Neiman | 40/152 |
| 3,254,927 | 6/1966 | Harvey | 40/152 |
| 3,885,336 | 5/1975 | Olsen | 40/152 |
| 3,965,600 | 6/1976 | Paskerian | 40/152.1 |
| 4,017,989 | 4/1977 | Murray | 40/152 |
| 4,041,630 | 8/1977 | Holbrook | 40/152.1 |
| 4,115,938 | 9/1978 | Belmuth et al. | 40/152 |
| 4,146,984 | 4/1979 | Lindquist | 40/152 |
| 4,258,488 | 3/1981 | Shienbein | 40/152 |
| 4,258,489 | 3/1981 | Maguire | 40/152.1 |
| 4,290,530 | 9/1981 | Wooster | 40/152 |

Primary Examiner—Gene Mancene
Assistant Examiner—James Hakomaki
Attorney, Agent, or Firm—Charles C. Logan, II

[57] ABSTRACT

A structure for displaying a phonograph album having a holder for the phonograph album and a decorative wall display frame. The holder has a framework formed from an alongated top frame member, an elongated bottom frame member, and a pair of laterally spaced elongated side frame members. A pair of bottom corner album support members extend outwardly from the front side of the framework. A pair of top corner side motion restraining members extend outwardly from the front side of the framework. A pair of diagonal brace members have their top ends connected to the elongated top frame member and their bottom ends connected to one of the respective elongated side frame members. A nail notch section is located between the top ends of the brace members. The top frame member and the bottom frame member each have a pair of laterally spaced connector notches formed in them so that a plurality of the holders for displaying a phonograph album can be connected together in a series arrangement. The decorative wall display frame has a top frame member, a bottom frame, and a pair of laterally spaced side frame members. A pair of laterally spaced guide channels are attached to the rear side of the decorative wall display frame and they run parallel to the side frame members. The bottom ends of these guide channels are open so that the decorative wall display frame can be slid down over the outer peripheral edges of the holder for displaying the phonograph album.

9 Claims, 4 Drawing Figures

COMBINATION HOLDER FOR DISPLAYING A PHONOGRAPH AND A DECORATIVE WALL DISPLAY FRAME

BACKGROUND OF THE INVENTION

The invention relates to the field of display frames, and more particularly to the field of frames for displaying phonograph record album covers.

Display frames for phonograph record album covers provide an economical means for attractively decorating a room. Ideally, such frames should be low in cost. Furthermore, the frames should be designed to permit easy record album mounting and removal so that the album on display can be readily changed or removed for playing. Also, an ideal frame would be designed in a manner which would permit several frames to be mounted on a wall near or adjacent to one another so that there will be a greater flexibility in decorating a wall. For example, an attractive effect can be achieved by covering an entire wall with album covers.

Phonograph record album frames on the market presently pocess several shortcomings. First, the prior art frames are typically complicated and expensive to manufacture. Second, these frames are not designed to facilitate ease of album mounting and removal. Furthermore, such prior art frames cannot be mounted closely together on a wall.

It is an object of this invention to provide a novel holder for displaying phonograph albums that is economical to manufacture and market.

It is also an object of the invention to provide a novel holder for displaying phonograph albums that can be used with a decorative wall display frame.

It is another object of the invention to provide a novel holder for displaying phonograph albums that has a structure for mounting a series of the holders together in an expandable vertical display pattern.

SUMMARY OF THE INVENTION

Applicant's novel combination holder for displaying a phonograph album in a decorative wall display frame has been designed so that they are economical to manufacture and market. The holder for displaying the phonograph album has a framework formed from a top frame member, a bottom frame member, and a pair of laterally spaced side frame members. A pair of bottom corner album support members extend outwardly from the front side of the framework. Also a pair of top corner side motion restraining members extend outwardly from the front side of the framework. A pair of laterally spaced diagonal brace members have their top ends connected to the top frame member and their bottom ends connected to the side frame members. A nail notch section is formedon the top frame member between the top ends of the brace members. The top frame member and the bottom frame member each have a pair of laterally spaced connector support notches formed in them so that a plurality of the holders can be connected in a series to form an expandable vertical display pattern.

The top frame member has a finger gripping access formed in it to aid in the removal of the album from the holder. Also a detachable support leg can be connected to the rear side of the framework if it is desired to use the holder on a flat support surface.

The decorative wall display frame has a top frame member, a bottom frame member, and a pair of laterally spaced side frame members. A laterally spaced pair of guide channels are mounted on the rear face of the display frame and they extend parallel to the side frame members. These guide channels are spaced apart substantially the width of the holder for displaying the phonograph album and the top ends of these guide channels have a top end wall which rests on top edge of the holder after the display frame has been slid downwardly thereover.

The holder and the display frame may be formed from a sheet of material such as plastic or sheet metal. Alternatively they could be formed by being molded from plastic material or formed in any other convenient conventional manner. Different styles of decorative wall display frames can be used to compliment the album or collection, such as modern, early American, antique, etc.

DESCRIPTION OF THE PREFERRED EMBODIMENT

Applicant's novel combination holder for displaying a phonograph album and a decorative wall display frame will be described by referring to FIGS. 1-4 of the drawings.

Figure 1:
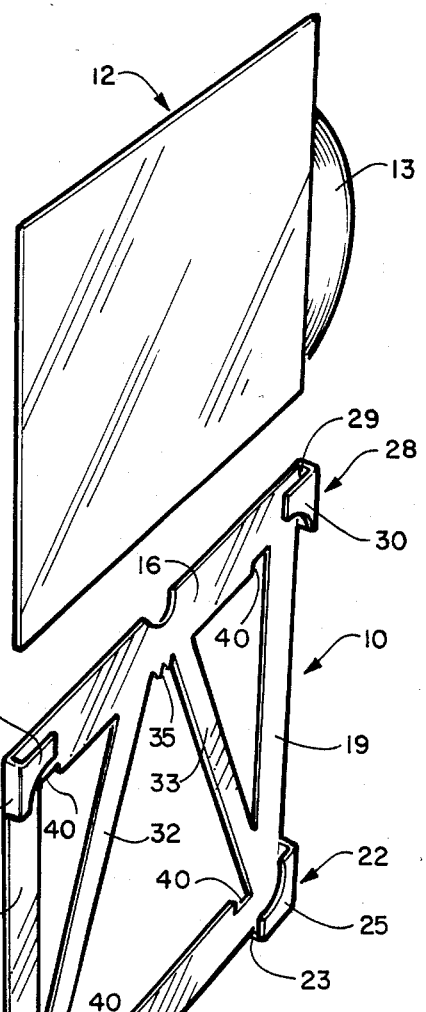
FIG. 1 is an exploded perspective view illustrating applicant's novel holder for displaying a phonograph album and the manner in which the record album is inserted therein.

The holder for displaying a phonograph album is generally designated numeral 10. In FIG. 1 a record album 12 having a record 13 inside it is illustrated in the exploded perspective view in a manner showing how the record album 12 would be inserted into the top of holder 10.

Holder 10 for displaying a phonograph album has an elongated flat strip top frame member 16, an elongated flat strip bottom frame member 17, and a pair of laterally spaced elongated flat strip side frame members 18 and 19 that form a flat framework. A pair of bottom corner album support members 22 extend outwardly from the front side of the framework. These bottom corner album support members each have a bottom wall portion 23, a side wall portion 24, and a front wall portion 25. A pair of top corner side motion restraining members 28 extend outwardly from the front side of the framework at its respective top corners. Front corner side motion retraining members 28 each have a side wall portion 29 and a front wall portion 30.

A pair of diagonal brace members 32 and 33 have their top ends connected to top frame member 16 and their bottom ends connected to side frame members 18 and 19 respectively. A nail notch section 35 is formed on top frame member 16 between the top ends of brace members 32 and 33.

Figure 3:
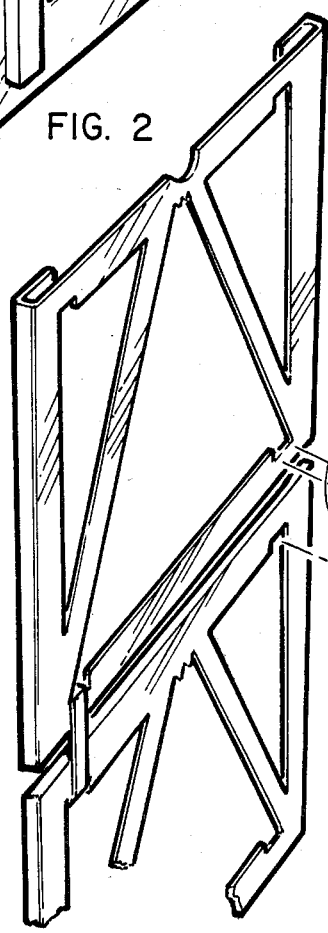
FIG. 3 is a perspective view illustrating the manner in which a plurality of applicant's novel holders for displaying phonograph albums are connected together in a vertical series display.
Figure 4:
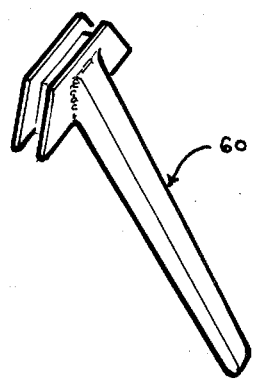
FIG. 4 is a perspective view of a detachable support leg that may be connected to the rear side of the framework of the holder for displaying a phonograph album.

The manner in which a plurality of the holders 10 are connected together in a vertical pattern is illustrated in FIG. 3. The top frame members 16 and the bottom frame members 17 of each of the holders 10 have a pair of laterally spaced connector support notches 40 formed in them. A connector 42 having a channel 43 at its top end and a channel 44 at its bottom end are detachably engaged in the respective connector support notches 40.

Figure 2:
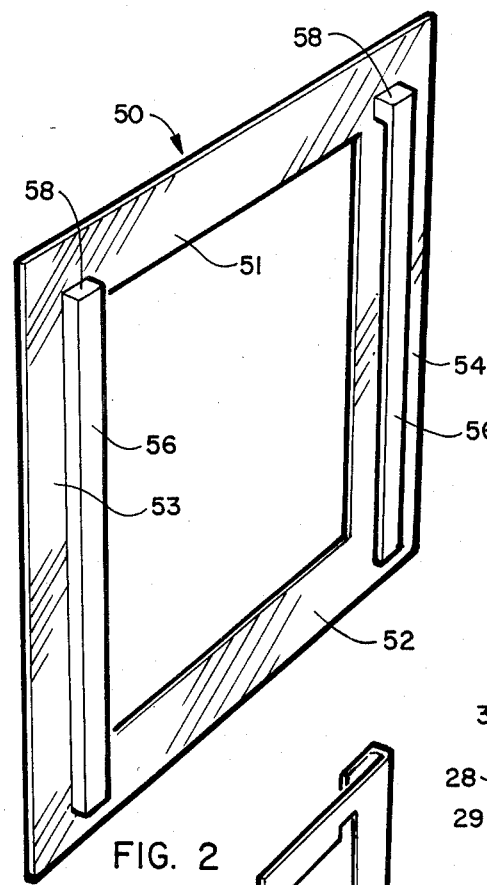
FIG. 2 is a perspective view illustrating applicant's novel decorative wall display frame.

In FIG. 2 the decorative wall display frame 50 is illustrated. It has an elongated top frame member 51, an elongated bottom frame member 52, and a pair of laterally spaced elongated side frame members 53 and 54. A pair of laterally spaced guide channels 56 are attached to the rear side of decorative wall display frame 50. Each of the guide channels 56 has a top wall 58 which limit the travel of the decorative wall display frame 50 as it is slid downwardly over the holder 10 for displaying a phonograph album.

What is claimed is:

1. A holder for displaying a phonograph album comprising:
    a flat strip top frame member, a flat strip bottom frame member, and a pair of laterally spaced flat strip side frame members having their top ends and bottom ends connected to the ends of the respective top and bottom frame members to form a flat framework having a front side and a rear side;
    a pair of bottom album support members extending outwardly from the front side of said flat framework and being located at the respective bottom corners of said flat strip bottom frame member, said bottom corner album support members each having a bottom wall portion and a front wall; and
    a pair of top corner side motion restraining members extending outwardly from the front side of said flat framework and being located at the respective top corners of said flat strip top frame member, said front corner side motion restraining members each having a side wall portion and a front wall portion.

2. A holder for displaying a phonograph album as recited in claim 1 further comprising brace means for strengthening the integrity of said flat framework.

3. A holder for displaying a phonograph album as recited in claim 2 wherein said brace means comprises a pair of laterally spaced flat strip diagonal brace members having their top ends connected to said flat strip top frame member and their bottom ends connected to one of said flat strip side frame members.

4. A holder for displaying a phonograph album as recited in claim 3 further comprising a nail notch section on said flat strip top frame member between the top ends of said flat strip diagonal brace members.

5. A holder for displaying a phonograph album as recited in claim 2 wherein said top frame member, said bottom frame member, said side frame members, and said brace means are formed from an integral sheet of material.

6. A holder for displaying a phonograph album as recited in claim 5 wherein said top frame member and said bottom frame member each have a pair of laterally spaced connector support notches formed in them.

7. A holder for displaying a phonograph album as recited in claim 5 further comprising a detachable support leg connected to the rear side of said framework.

8. A holder for displaying a phonograph album as recited in claim 1 in combination with a decorative wall display frame.

9. A holder for displaying a phonograph album as recited in claim 8 wherein said decorative wall display frame comprises an elongated top frame member, an elongated bottom frame member, and a pair of laterally spaced elongated side frame members having their top ends and bottom ends connected to the respective top and bottom frame members to form a display frame having a front side and a rear side.

* * * * *